C. ELLIS.
PROCESS OF MAKING BENZYL CHLORID FROM TOLUOL.
APPLICATION FILED AUG. 16, 1912.
1,202,040.
Patented Oct. 24, 1916.
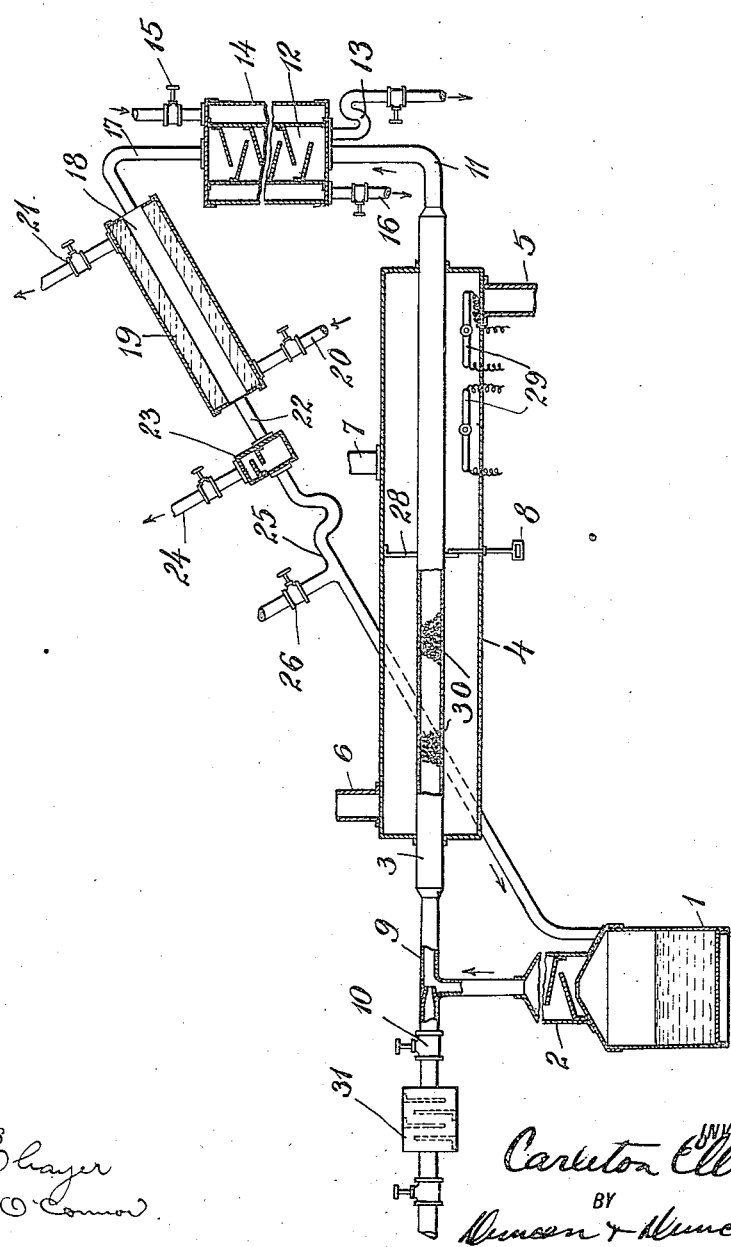
WITNESSES
INVENTOR
Carleton Ellis
BY
Duncan & Duncan
ATTORNEYS

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

PROCESS OF MAKING BENZYL CHLORID FROM TOLUOL.

1,202,040.  Specification of Letters Patent.  Patented Oct. 24, 1916.

Application filed August 16, 1912. Serial No. 715,325.

*To all whom it may concern:*

Be it known that I, CARLETON ELLIS, a citizen of the United States, and resident of Montclair, Essex county, New Jersey, have made a certain new and useful Invention Relating to Processes of Making Benzyl Chlorid from Toluol, of which the following is a specification, taken in connection with the accompanying drawing, which forms part of the same.

This invention relates to the manufacture of benzyl chlorid from toluol by the continuous circulation of an excess of toluol through the apparatus, in which an excess of toluol vapor is produced and acted upon by chlorin at an elevated temperature to promote the side chain chlorination preferably under gradually increasing temperature conditions and in the presence of actinic action to promote the chlorination. The benzyl chlorid may then be condensed and removed and the remaining vaporous material subsequently condensed and the hydrochloric acid substantially eliminated before the remaining toluol is returned to the still for retreatment.

In the accompanying drawing an illustrative form of apparatus for carrying out this process is shown somewhat diagrammatically and as indicated the still 1 may be provided with a suitable dephlegmator 2 so as to vaporize the toluol delivered to the treating conduit or chamber 3 to which chlorin is also supplied as through the chlorin pipe 9 in which a suitable valve 10 may be provided to regulate the amount of chlorin. The chlorin may be preheated to the desired extent by a suitable heater, such as 31, so that the chlorin is brought up to the desired temperature before coming into contact with the toluol vapor. The treating chamber may be heated in any way as by arranging it within an air heater or other heating jacket 4 to which hot air may be supplied as through the inlet 5 so as to pass along through the heating jacket before being discharged from the outlet 6. Any desired number of baffles or partitions 28 may be formed within this heating jacket, preferably having apertures or passages adjacent their lower portions which are controlled by suitable regulating valves or dampers such as 8 to insure the desired heat distribution throughout the jacket, part of the heated air or other medium being, if desired, discharged through intermediate discharge pipes, such as 7. If desired, the treating chamber or conduit may be subjected to the influence of actinic accelerating means preferably after the reaction has been largely completed and for this purpose the desired number of mercury lights 29 may be arranged adjacent to or around the treating conduit or chamber adjacent its discharge end, the chamber and lighting tubes being preferably formed of quartz glass to permit this actinic action. For some purposes, it is also desirable to use suitable catalyzing material preferably in the preliminary portion of the treatment and phosphorous pentachlorid and so forth may be used to advantage in this way where the temperature is not undesirably high. The preliminary portions of the conduit or chamber may also be filled more or less with suitable accelerating or catalyzing material such as fragments of pumice, porcelain or glass beads and so forth as indicated at 30, these materials considerably promoting the reaction desired.

The treated vapors entering the pipe 11 comprise benzyl chlorid and hydrochloric acid gas which are the products of this side chain chlorination and also the large proportion of unchanged toluol vapor, the toluol vapor being preferably only converted in this treating chamber to the extent of a quarter or a half during each passage. These mixed vapors are preferably passed through a dephlegmator to substantially eliminate the benzyl chlorid therefrom and the dephlegmator 12 is diagrammatically indicated as being provided with a cooling jacket 14 in which superheated steam, air or other vapor is circulated as through the valved jacket pipe 15, the drip and discharge material being discharged through the pipe 16. In this way the jacket may be maintained at the desired temperature about 150 degrees C. giving good results in general commercial operation, the dephlegmator by means of conductive partitions or otherwise being thus maintained at a temperature slightly below the condensing temperature of benzyl chlorid which is about 179 degrees C., although the jacket temperature may of course be varied within considerable limits, depending upon the construction of the dephlegmator, the amount of material condensed and so forth. The condensed benzyl chlorid must be removed continually or from time to time through the trapped discharge pipe 13. The remaining vapor may pass from the dephlegmator through the pipe 17 into a suitable toluol condenser 18 provided with the water or other cooling jacket 19 in which the circulation is maintained through the valved inlet 20 and outlet 21. The toluol is condensed with substantial completeness in this way and flows through the pipe 25 back into the still, the hydrochloric acid gas being eliminated with substantial completeness by the interposed separating chamber 23 from which the gas is allowed to discharge through the valved pipe 24 communicating with condensing or utilizing devices of the character desired. Additional toluol or material largely consisting thereof may be continuously supplied to the system as through the valved inlet 26 communicating adjacent the trapped portion of the pipe 25 leading to the still 1.

Having described this invention in connection with a number of illustrative embodiments, apparatus, devices, materials, proportions, temperatures and orders of steps, to the details of which disclosure the invention is not of course to be limited, what is claimed as new and what is desired to be secured by Letters Patent is set forth in the appended claims:

1. The process of making benzyl chlorid which comprises continuously mixing toluol vapor and heated chlorin gas in sufficient amount to combine with between 25 and 50% of said toluol vapor, passing said mixed vapors through a zone of heat at a temperature above and independent of the boiling point of toluol and gradually increasing the temperature of the mixed vapors while in said zone, in condensing and separating benzyl chlorid from the treated vapors, in condensing toluol in the remaining vaporous material and separating hydrochloric acid gas therefrom and in continuously supplying additional toluol material thereto before again vaporizing the same.

2. The process of making benzyl chlorid which comprises mixing toluol vapor and chlorin gas, in subjecting the mixed vapors to heat in a heat zone at temperatures independent of and above the boiling point of toluol and in increasing the temperature of said vapors while in said heating zone.

3. The process of making benzyl chlorid which comprises mixing toluol vapor and heated chlorin gas in sufficient amount to combine with part of said toluol vapor, in passing the mixed vapors through a zone of heat maintained at a temperature independent of and above the boiling point of toluol to form benzyl chlorid and hydrochloric acid and in condensing and separating benzyl chlorid from the treated vaporous material.

4. The process of making benzyl chlorid which comprises mixing toluol vapor and chlorin gas and in passing the mixed vapors into and through a zone of heat maintained at a temperature independent of and above the boiling point of toluol.

5. The process of making benzyl chlorid which comprises continuously mixing toluol vapor and chlorin gases, in passing the mixture as a continuous current from the vaporizing space into an elongated heating zone wherein the temperature of the gaseous current is progressively raised to a point substantially above the boiling point of toluol, whereby benzyl chlorid is formed, in withdrawing the reaction mixture and separating the benzyl chlorid.

CARLETON ELLIS.

Witnesses:
JESSIE B. KAY,
ALBERT E. THAYER.